Sept. 12, 1939.  M. ROMAINE  2,173,074
BROACHING TOOL
Filed Nov. 23, 1936
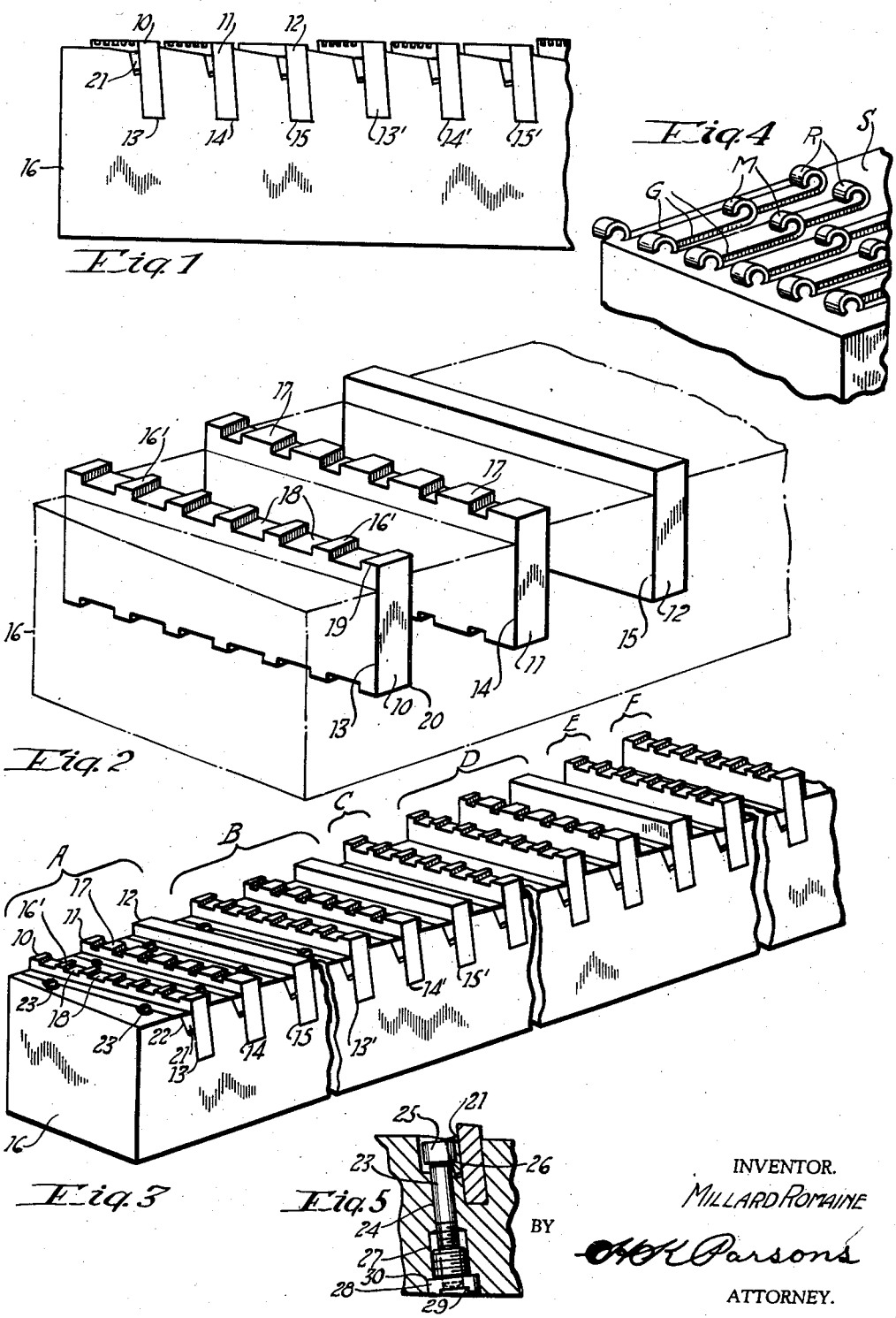
INVENTOR.
MILLARD ROMAINE
BY
A. H. Parsons
ATTORNEY.

Patented Sept. 12, 1939

2,173,074

UNITED STATES PATENT OFFICE 2,173,074

BROACHING TOOL

Millard Romaine, Cincinnati, Ohio, assignor to The Cincinnati Milling Machine Co., Cincinnati, Ohio, a corporation of Ohio Application November 23, 1936, Serial No. 112,204

3 Claims. (Cl. 29—95.1)

This invention relates to the art of broaching, and more particularly to improvements in a method and apparatus therefor.

One of the objects of this invention is to provide an improved method for removing metal by broaching, which is more efficient than prior methods and which is especially adaptable for use in connection with relatively fragile materials, such as cast iron and the like.

Another object of this invention is to provide an improved surface broaching tool which in operation will develop less tooth pressure and require less total operating force than present known tools, thereby reducing the total power requirement of a machine in which the same is utilized.

A further object of this invention is to provide improved clamping means for an inserted tooth type of broach.

Other objects and advantages of the present invention should be readily apparent by reference to the following specification, considered in conjunction with the accompanying drawing forming a part thereof and it is to be understood that any modifications may be made in the exact structural details there shown and described, within the scope of the appended claims, without departing from or exceeding the spirit of the invention.

Referring to the drawing in which like reference numerals indicate like or similar parts:

Figure 1 is a side view of a broaching tool embodying the principles of this invention.

Figure 2 is a perspective view of one set of blades of the broaching tool.

Figure 3 is a perspective view showing the general arrangement of a plurality of sets of blades for removing a considerable thickness of material from a plane surface.

Figure 4 is a detail view showing the method of cutting by a set of blades.

Figure 5 is a sectional detail view of the blade clamping means.

In the art of broaching it is well known that certain variable factors, such as the cross sectional area of the chips being removed and the kind of material being worked upon, determine to a large extent the efficiency of operation of the machine. The cross sectional area of the chips being removed, of course, depends upon the arrangement of the cutting teeth of the broach itself and the amount of material assigned to be removed by each tooth. The pressure on each tooth does not rise in direct proportion to the increase in the thickness of the chip, nor in direct proportion to increases in the width of the chip, but it seems that after certain limits are reached, the tooth pressure required to effect separation of the chip rises very rapidly for small increases in chip dimensions.

Furthermore, with comparatively fragile materials, like cast iron, having a relatively low tensile strength, there is a tendency at the end of a cut for the material to fracture or chip off, the extent of which depends in a large measure upon the thickness of the individual chips being removed. This results in a rather ragged edge and results in a surface having an unworkmanlike appearance.

This invention deals first with a new method of removing material, consisting of a first step in which a series of narrow longitudinal grooves G, Figure 4, are formed in the surface of the work and preferably spaced equal distances transversely thereof; secondly, of removing substantially one-half of the material M remaining between the grooves and to a depth equal to the depth of the grooves; thirdly, of removing the remainder of the material R between the grooves, whereby a substantially plane surface S is again produced; and fourthly, of repeating the above steps and progressively reducing the thickness of each layer in substantial accordance with a geometrical progression until the final layer removed is of the order of only a few thousandths of an inch. It is obvious that this method can, of course, be carried out manually.

One form of apparatus for accomplishing the foregoing method has been depicted in the drawing. In Figure 2 there is shown one set of blades for removing one layer of material. The apparatus which is in the form of a broaching tool may consist of a plurality of these sets, the number of which will depend upon the amount of material to be removed. For purposes of illustration, a set may consist of three blades 10, 11 and 12 which are positioned in cross slots 13, 14 and 15 respectively formed in a base or supporting member 16. All of these blades have the same overall height and the slots are all cut to the same depth, with the result that no stepped relation exists between the blades of one set. One advantage of this is that these blades can be stacked together and simultaneously ground to sharpen the same.

The blade 10 is serrated across the top surface to provide a series of cutting teeth 16' which are all of substantially the same width but which together will remove only one-third or less of the material in any particular layer of removable material. In other words, they will function to cut the grooves G shown in Figure 4. The second blade, such as 11, is also serrated to provide a series of cutting teeth 17, and these are of such width, and so aligned with the spaces 18 occurring between the teeth 16' of the first blade, as to remove substantially one-half of the material or land M left between each groove formed by the first set of cutting teeth 16'. For simplicity and economy in manufacture, the third blade may be simply a continuous straight blade for performing the function of removing the remainder of the material R left by the first two blades, but of course, it is obvious, if so desired, that it may also be serrated the same as blade 11, except that the teeth thereon will be aligned with the open spaces between the teeth 17 of blade 11 so as to remove the material passing between these teeth.

This unit of cutting blades thus functions to remove a layer of material, regardless of its thickness, by first forming a series of grooves with intervening lands, and then removing the lands in two sections and by separate means with the advantageous result that the subsequent chips which are removed have a chance to flow laterally into the grooves, thereby preventing binding; and keeping the tooth pressure at a minimum.

In the manufacture of the separate blades, the lower half of the blade may be made in symmetrical relation to the upper half of the blade so as to provide cutting edges 19 and 20 whereby any blade may be removed, turned 180° about its longitudinal axis and reinserted to provide a new set of cutting teeth.

As shown in Figure 3, the tools of the broach may consist of groups A, B, C, etc., and each group may consist of one or more sets, but the amount of material to be removed by a set in each group will decrease in approximately a geometrical progression. If there is one set in each group, then there will be a continuous geometrical progression down to the last set. Or starting at the last set of cutters, which preferably should remove not more than .001" or .002", there will be an approximate geometrically progressive increase until the summation of the series equals the total amount of material to be removed. Since there is a limit, however, to the amount that a single blade should remove in order to keep the pressure thereon to a desired minimum, which may be in the neighborhood of .025", it may be necessary to increase the number of sets in each group until the desired total is reached.

In view of the foregoing it will, of course, be apparent that the support 16 will have the cross slots cut to depth in accordance with the job to be worked on, since no means are provided for adjusting the blades outward, and since all of the blades rest on the bottom of the slots. In other words, the slots must be stepped in accordance with the amount of material to be removed by the particular blade in the slot.

The specific means for clamping a blade in the holder is shown more particularly in Figure 5 of the drawing and comprises a wedge-shaped clamping member 21 which has a longitudinal extent equal to the width of the holder.

This clamping member fits into a tapered recess 22 formed in one wall of the blade-receiving slot whereby upon downward pressure being exerted upon the clamping member, the blade will be securely held in the holders. This pressure may be exerted by clamping bolts 23 inserted in holes 24 which intersect the recess 22. The head 25 of these bolts engages shoulders 26 recessed in the clamping member so that when the bolt is tightened the clamping member will be drawn into engagement with the blade.

Since the holder itself is usually made from relatively fragile material, as for instance, cast iron, while the clamping bolts are made of a less fragile material, usually steel, it has been found that the cast iron threads on the holder will wear away quickly or become stripped. In order to eliminate this the ends of holes 24 are counterbored at 27 to receive a threaded steel plug having an enlarged head 28 in which is formed a cross slot 29 to facilitate assembly. A threaded hole 30 is formed in the center of this plug for receiving the threaded end of the clamping bolt 23. This construction eliminates the possibility of thread failure in the holder.

The amount of marginal fracture at the end of the cut on the work piece more or less depends upon the thickness of the chip being taken, and even although there is a large amount of breaking out caused by the first few sets, the following sets removing chips of gradually reducing thickness will eventually clean up and produce a satisfactorily finished surface.

It will thus be seen that a broaching tool has been provided in which the load on any one tooth is not excessive, with the result that the total force necessary to effect relative movement between the broaching tool and the work to remove the desired amount of material is within economical and practical limits and that the broaching tool itself is very simple in design and very easy and economical to manufacture.

What is claimed is:

1. A broaching tool having in combination a plurality of sets of blades, each set including a first blade having a plurality of spaced narrow teeth for producing a plurality of narrow slots in the work, a second blade having a plurality of teeth alternately spaced with respect to the teeth on the first blade and of sufficient width to remove a portion of the material remaining between said slots, and a third blade having means thereon for removing the remainder of the material between said slots.

2. A broaching tool comprising a body portion, a plurality of cross slots formed in said body portion and spaced equally distant longitudinally thereof, said cross slots being divided in groups of two or more, the depth of the slots in any one group being uniform and the depth of the successive groups of slots decreasing, cutting blades of uniform height mounted in the respective slots whereby said groups of blades will remove respectively different thicknesses of material, and serrations formed in the first blade of each group to reduce the chip pressure per blade.

3. A broaching tool consisting of a main body member of uniform thickness, three cross slots of uniform depth formed in said body member, three cutting blades of uniform height mounted in the respective slots, serration formed in the cutting edge of the first blade to form a plurality of spaced narrow slots in the work with intervening lands, serrations formed in the cutting edge of the second blade and located in aligned relation to the slots formed in the first blade for removing a portion of said lands, and means on the third blade for removing the remaining portions of said lands.

MILLARD ROMAINE.